Aug. 15, 1961  W. C. ROWE ET AL  2,996,095
LAMINATED ARTICLE
Filed Nov. 19, 1958
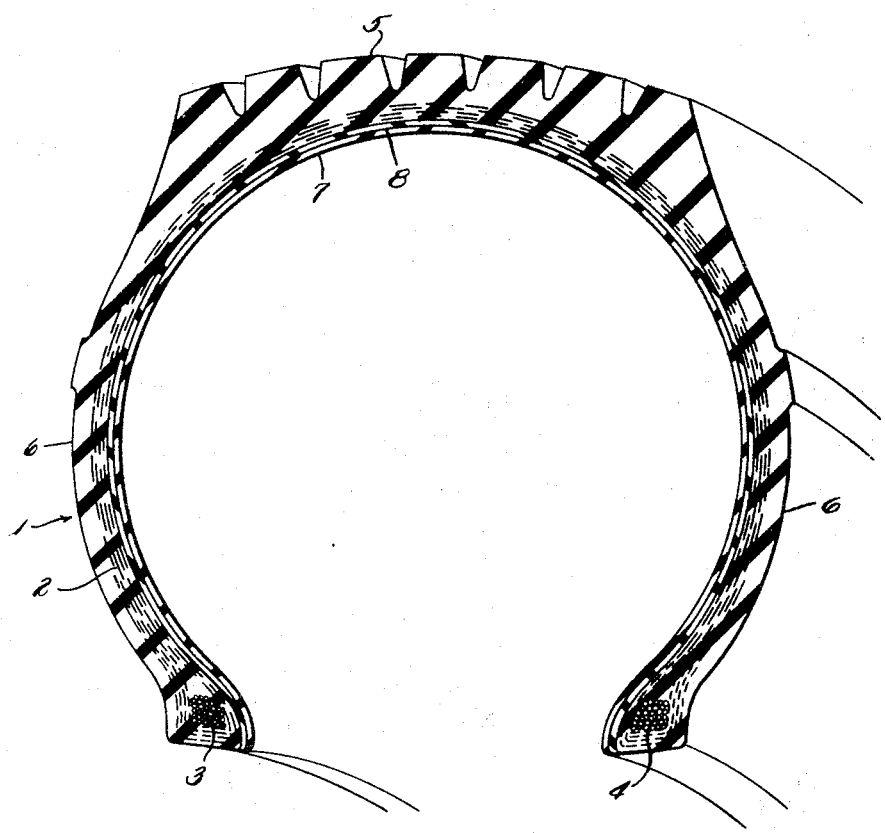
INVENTORS
WALTER C. ROWE
RICHARD R. SAWDEY
BY
W. G. Fraser
ATTY.

United States Patent Office 2,996,095
Patented Aug. 15, 1961

2,996,095
LAMINATED ARTICLE
Walter C. Rowe and Richard R. Sawdey, Akron, Ohio, assignors to The Firestone Tire & Rubber Company, Akron, Ohio, a corporation of Ohio
Filed Nov. 19, 1958, Ser. No. 774,991
4 Claims. (Cl. 152—330)

This invention relates to an improved adhesive bond between layers formed of rubbery copolymers of an iso-olefin and an open-chain conjugated diolefin and rubbery layers formed of copolymers containing a significant portion of a diene such as an open-chain conjugated diolefin; for example isoprene or butadiene. More particularly, the invention relates to an improved vulcanized bond between layers of so-called butyl rubber and layers of synthetic rubber such as GR–S rubber which is a copolymer of butadiene and styrene.

This application is a continuation-in-part of application Number 613,093, filed October 1, 1956, and now abandoned.

The vulcanized adhesion of the butyl-type polymers to copolymers containing dienes such as conjugated diolefins is poor for the reason that during the vulcanization reaction, the copolymers comprised in part of diolefins, having much greater unsaturation than butyl rubber, "hog" the vulcanizing agent with the result that the slower vulcanizing butyl-type rubber does not vulcanize completely. It is thought that this difference in vulcanization rate has resulted in poor vulcanized adhesion between layers of synthetic rubber containing diolefins vulcanized to layers of butyl-type rubber in the manufacture of vulcanized laminated articles such as pneumatic tires.

The present invention overcomes the difficulties of the prior art in adhering layers of rubbery copolymers of butadiene and styrene to layers of butyl-type rubber by means of chlorinating the butyl-type rubber and adding a modified non-reactive phenol resin to one rubber component of the laminated rubber article before that article is vulcanized.

It is therefore an object of the invention to improve the vulcanized bond between layers formed of synthetic rubber polymers comprised of copolymers of open chain conjugated diolefin monomers such as butadiene with aromatic ethylene monomers such as styrene and layers formed from copolymers of a major portion of an iso-olefin having from 4 to 8 carbon atoms and a minor portion of an open-chain conjugated diolefin having from 4 to 7 carbon atoms. It is also an object of the invention to improve the vulcanized adhesion of layers containing butyl rubber to layers containing copolymers of conjugated diolefins with aromatic ethylene monomers by incorporating in the butyl-type rubber layer both chlorine and a phenol-aldehyde resin. Yet a further object of the invention is to provide a rubbery article comprised of laminated layers comprised of synthetic rubber comprised of copolymers of butadiene and styrene bonded to layers comprised of butyl-type rubber through the use of phenol-aldehyde resin and the chlorination of the butyl-type rubber used in one layer. These and other objects of the invention will be more fully understood with reference to the specification, claims and the drawing which is a fragmentary perspective view in section showing the invention as used in pneumatic tubeless tires.

Butyl rubber of the type used in the invention may be manufactured by the procedure disclosed by Robert M. Thomas and William J. Sparks in U.S. Patent No. 2,356,-128 and which comprises preparing a mixture of an iso-olefin such as isobutylene in the proportion of from 70 to 99.5 parts with an open-chain conjugated diolefin such as butadiene or isoprene in the proportion of 30 to .5 parts. The mixture is cooled to a relatively low temperature, preferably below −50° C. in the presence of a metal halide catalyst such as aluminum chloride. The polymerization reaction results, after further treatment, in a rubbery vulcanizable material.

One procedure for chlorinating butyl-type rubber is disclosed in U.S. Patent No. 2,442,083. In the preferred preparation of a chlorinated butyl-type rubber, the polymer is mixed with a chlorinating material such as "Halane" (manufactured by the Wyandotte Chemical Company) on a two roll mill. Chlorine is thus incorporated in the polymer which then may be compounded with conventional compounding ingredients to produce a rubber composition having vulcanization characteristics. Another chlorinating agent which may be mixed with butyl-type rubber on a mill is "Dactin" sold by E. I. du Pont de Nemours & Company. From 3 to 10 parts of Halane to 100 parts of butyl is useful in the invention while 4 to 5 parts is preferred.

The chlorinated butyl-type rubber was prepared according to the following formula:

COMPOUND I

| | |
|---|---|
| GR–I 50 | 100.00 |
| Halane [1] | 4.0 |
| Stearic acid | 1.0 |

[1] Dichlorodimethyl hydantoin sold by the Wyandotte Chemical Company, Wyandotte, Michigan.

The above formulation was mixed in a Banbury mixer under conditions which yielded a temperature which reached 200° F. in 4½ minutes. The resulting product was sheeted out on a mill for use as will be described.

Although certain chlorinating materials have been set out by way of example, the invention is not limited thereto. The invention resides in using butyl-type rubber containing at least .8% chlorine based on the weight of butyl-type rubber hydrocarbon present while ranges of .8 to 1.8% are extremely useful while about 1% is preferred.

In view of the invention the phenol resin is a phenol aldehyde resin of the "novalac" type such as Amberol ST–137X and the like. Amberol ST–137X is a commercial phenolic resin manufactured, it is thought, by reacting one mole of phenol with one mole of formaldehyde with an acid catalyst. Such resins are termed "novalacs" which are not heat reactive but are permanently fusible.

In the preparation of one of the synthetic copolymers useful in the invention, butadiene and styrene are brought together under conditions which result in copolymerization to yield a rubbery copolymer of these two monomers. Although the copolymerization of the two monomers may occur at a temperature of 122° F., excellent rubbery materials are obtained by copolymerizing the monomers at lower temperatures such as 58° F., 41° F., 14° F., 0° F., and −14° F. Such materials are described in an article in Industrial and Engineering Chemistry, May 1948, by McKensie, Samuels and Sheron. Copolymers formed at temperatures lower than 122° F. are generally known as low temperature polymers (LTP) or "cold rubber." Although the invention is satisfactory with all the GR–S polymers, LTP is preferred for the best adhesion results.

In practicing one form of the invention, natural rubber is masticated on an open two roll mill or in a closed rubber mixer such as a Banbury mixer. Various pigments are added during the mastication of the natural rubber according to the following formula, all parts in this and other examples herein being by weight of rubber copolymers present:

COMPOUND II

| | |
|---|---|
| GRS-type | 100.00 |
| Carbon black | 30.00 |
| Stearic acid | 1.00 |
| Zinc oxide | 3.00 |
| Sulfur | 2.50 |
| Softener | 4.00 |
| Accelerator | 1.50 |
| Antioxidant | 1.00 |
| | 143.00 |

The rubbery compound according to the above formulation was broken down on a rubber mill and cut into sheets having dimensions of 6 inches x 9 inches for lamination to chlorinated butyl rubber layers as will be described.

In compounding the chlorinated butyl rubber portion of the laminated article, the polymer was broken down on a two roll mill and the various pigments were added to produce compounds of the following formula:

*Example I*

| | Control | 1 | 2 |
|---|---|---|---|
| Natural Rubber | 20.00 | 20.00 | 20.00 |
| Chlorinated Butyl (Compound I) | 80.00 | 80.00 | 80.00 |
| Hydrated Silica Oxide | 40.00 | 40.00 | 30.00 |
| Carbon Black | 20.00 | 20.00 | 20.00 |
| Stearic Acid | .40 | .40 | .40 |
| Zinc Oxide | 7.00 | 7.00 | 7.00 |
| Softener | 3.00 | 3.00 | 3.00 |
| Retarder | .30 | .30 | .30 |
| Calcium Silicate | 3.00 | 3.00 | 3.00 |
| Sulfur | 2.00 | 2.00 | 2.00 |
| Captax | 1.00 | 1.00 | 1.00 |
| Tuads [1] | .50 | .50 | .50 |
| Phenol-Aldehyde Resin [2] | | 2.50 | 10.00 |
| | 177.20 | 179.70 | 177.20 |

[1] Tetramethylene thiauram disulfied sold by the R. T. Vanderbilt Company of New York, New York.
[2] Such as a modified non-reactive resin sold by Rohm & Haas Chemical Company under the trade name of "Ambersol St 137X."

The compounds of Example I were sheeted out on a calendar to a thickness of one quarter inch and cut into sheets having a dimension of 6 inches x 9 inches. A sheet of each of the compounds of Example I was superimposed on a sheet of Compound II in face to face relation to form a laminated structure.

A strip of holland cloth was placed between the two sheets at the edges thereof to provide two free marginal flaps after vulcanization. (The marginal flaps are grasped by the testing machine after vulcanization and used to pull the vulcanized sheets apart to measure adhesion.) Each structure was sandwiched between two sheets of unvulcanized rubberized weftless fabric and each was vulcanized in a vulcanizing press at a temperature of 280° F. for 90 minutes, removed from the press and cut into strips 1" wide. The free flaps were clamped respectively in the jaws of a Cooey adhesion tester and drawn apart at a rate of 2 inches per minute. Adhesion between the vulcanized layers was measured in pounds/inch at ambient temperature.

Adhesion results of compounds of Example I to the rubber stock of Compound II were as follows:

Example I:  Lbs. adhesion
 "Control" compound to rubber of Compound II__ 24
 "Formula #1" to rubber of Compound II_____ 33
 "Formula #2" to rubber of Compound II____ 57

The results of the above example show that the combined use of chlorinated butyl and phenol-aldehyde resin in the butyl rubber polymer greatly improves the adhesion of a layer of the butyl type material to GRS-type rubber. Other ingredients which may be added to both the natural rubber portion and the butyl rubber portion in the above example include anitoxidants, softeners and reinforcing pigments as necessary to obtain desired results without effecting the improved adhesion obtained by the invention.

Referring to the drawing, a tubeless pneumatic passenger tire generally indicated at 1 is comprised of a fabric reinforced portion 2 terminating at each edge in inextensible beads 3 and 4. Superimposed on fabric portion 2 is a tread portion 5 and a sidewall portion 6. To make the tire a pneumatic container without the use of an inner tube, a liner portion 7 of butyl rubber is adhered across the open belly of the tire from bead to bead.

To adhere the liner 7 to the tire casing in view of the present invention, an intermediate layer 8 comprised of chlorinated butyl rubber containing phenol-aldehyde resin is inserted between the casing and the liner and adhered to both these portions by vulcanization. Whereas the prior art butyl rubber liner would easily separate from the belly of the tire casing during operation of the tire because of the poor adhesion of the butyl to natural or synthetic rubber, the present invention through the use of the ply 8 provides satisfactory adhesion to make the liner 7 an integral part of the tire.

The butyl inner liner 7 also may be adhered to the rubbery portion of the tire casing by the use of a solvent adhesive comprised of a solution of chlorinated butyl rubber compounded with the phenol-aldehyde resin. In this form of the invention, a stock of the formulation shown in Example I is dissolved in a solvent such as toluene, xylene, naphtha or the like until a total solids concentration of about 10 to 20 percent by weight is obtained. The adhesive may then be used to adhere the butyl rubber inner liner 7 to the adjacent natural or synthetic rubber layers of the belly of the pneumatic tire.

Referring to the drawing, the ply 8 may be applied either as a calendered sheet or as an adhesive solution as described above. When applied as an adhesive, the belly of the unvulcanized tire band is coated with the adhesive solution. After evaporation, a tacky surface remains on the tire belly. The unvulcanized vulcanizable sheet of butyl rubber next is applied to the tacky surface and pressed into intimate face to face contact with the surface, care being taken to prevent trapping of air between the butyl sheet and the tire. The tire is shaped and vulcanized with heat and pressure in a conventional manner with the result that the butyl rubber layer 7 is firmly adhered to the tire casing. The vulcanizing conditions being preferably from 250 to 340° F. from 10 to 90 minutes.

Although several forms have been illustrated by way of example, it will be apparent to those skilled in the art that modification may be made in the invention within the scope of the following claims.

We claim:

1. In an open bellied pneumatic tubeless tire, the combination of a rubberized fabric body portion comprised of a vulcanized rubbery copolymer of an open-chain conjugated diolefin and styrene and an air impervious linear member vulcanized to the surface of said rubbery body portion, said liner comprised of a chlorinated rubbery copolymer of a major portion of an isoolefin having from 4 to 7 carbon atoms and a minor portion of an open-chain conjugated diolefin having from 4 to 8 carbon atoms and containing at least .8 part chlorine based on the weight of isoolefin polymer and compounded with from 2 to 15 parts of a non-reactive phenol-aldehyde resin based on 100 parts by weight of copolymer.

2. An open bellied pneumatic tubeless tire according to claim 1 wherein the resin is the reaction product of one mole of phenol with one mole of an aldehyde with an acid catalyst.

3. An open bellied pneumatic tubeless tire according to claim 1 wherein the aldehyde is formaldehyde and the chlorine is present in from .8 to 1.5 parts by weight.

4. A method of applying an innerliner to a tubeless tire comprising in combination the steps of chemically modifying a rubbery copolymer of from 70 to 99.5 parts of an isoolefin having from 4 to 7 carbon atoms with from .5 to 30 parts of a conjugated diolefin having from 4 to 8 carbon atoms by masticating 100 parts of said rubbery copolymer with from 3 to 10 parts of dichlorodimethyl hydantoin at a temperature of not exceeding 200° F. to yield an essentially unvulcanized, vulcanizable material, mixing said material with vulcanizing agents and from 2 to 15 parts of a non-reactive novalac resin of phenol and formaldehyde based on 100 parts by weight of copolymer, applying the resulting composition to the interior of a tire casing having a carcass comprising cord fabric coated with a vulcanizable rubbery copolymer of an open-chain conjugated diolefin and styrene, and vulcanizing said tire at a temperature of from 250 to 340° F. for from 10 to 90 minutes.

References Cited in the file of this patent

UNITED STATES PATENTS

| | | |
|---|---|---|
| 2,442,083 | Hall et al. | May 25, 1948 |
| 2,673,826 | Ness | Mar. 30, 1954 |
| 2,698,042 | Perkins | Dec. 28, 1954 |
| 2,788,839 | Kindle et al. | Apr. 16, 1957 |
| 2,804,448 | Hallenbeck | Aug. 27, 1957 |
| 2,822,026 | Willis | Feb. 4, 1958 |
| 2,822,311 | Rowe et al. | Feb. 4, 1958 |